(12) United States Patent
Canora et al.

(10) Patent No.: US 9,478,254 B2
(45) Date of Patent: Oct. 25, 2016

(54) STORYTELLING ENGINE

(75) Inventors: David J. Canora, Winter Garden, FL (US); Robert Alan Swirsky, Sunnyvale, CA (US); Michael J. Gomes, Windermere, FL (US)

(73) Assignee: Disney Enterprises, Inc., Burbank, CA (US)

( * ) Notice: Subject to any disclaimer, the term of this patent is extended or adjusted under 35 U.S.C. 154(b) by 1202 days.

(21) Appl. No.: 12/890,960

(22) Filed: Sep. 27, 2010

(65) Prior Publication Data

US 2012/0079360 A1    Mar. 29, 2012

(51) Int. Cl.
*G06F 15/02* (2006.01)
*G11B 27/034* (2006.01)

(52) U.S. Cl.
CPC ............. *G11B 27/034* (2013.01); *G06F 15/02* (2013.01)

(58) Field of Classification Search
USPC .......................................................... 715/202
See application file for complete search history.

(56) References Cited

U.S. PATENT DOCUMENTS

2004/0218058 A1* 11/2004 Yamaguchi et al. ........ 348/218.1
2008/0062283 A1*  3/2008 Matsushita et al. ...... 348/231.99

* cited by examiner

*Primary Examiner* — Kavita Padmanabhan
*Assistant Examiner* — Tionna Burke
(74) *Attorney, Agent, or Firm* — Ference & Associates LLC

(57) ABSTRACT

Systems and associated methods for generating custom media products along various story arcs are described. The story arcs correspond to sub-themes for organizing media content within a larger theme, or story, into a custom media product. The media content can include stock media content, guest-specific or custom media content, which can include rendered content. Embodiments utilize authoring tools and automated workflow mechanisms to take various forms of raw media content and create customized media products for individual guests or groups of guests.

20 Claims, 7 Drawing Sheets

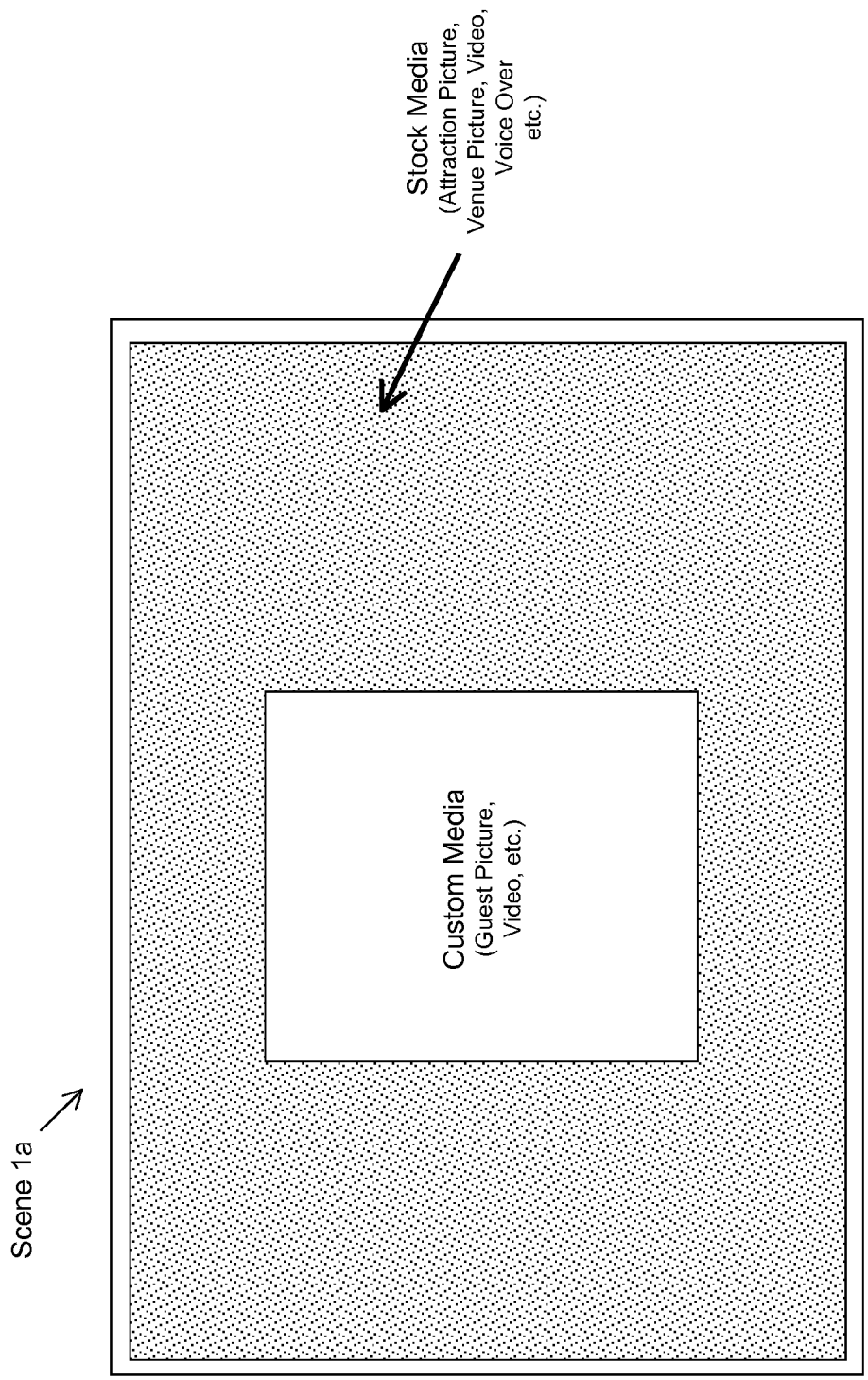

STORYTELLING ENGINE

FIELD OF THE INVENTION

The subject matter presented herein generally relates to customized media content generation.

BACKGROUND

The creation rate of media content, such as pictures and videos, has increased because of the wide availability of digital systems, such as digital cameras. A popular use of digital systems is to memorialize special events, such as trips and vacations. In this context, it is common for individuals to have pictures and/or videos taken of themselves and/or family and friends during a variety of activities.

Guests often have their pictures taken at destination venues, such as amusement and theme parks, for example while riding a particular ride, posing with a particular character, engaging in park activities, and so on. In this regard, the various venues that attract guests attempt to provide services to guests in order to assist the guests in creating custom media content for memorializing the experiences had at these venues. Conventionally this has been accomplished by either taking pictures/videos of guests while on attractions, for example rides, and providing the guests with the opportunity to purchase the photos/videos at the completion of the ride; or, providing a photographer at the venue to take pictures of guests, noting which guest the pictures correspond to, and providing the guests with the opportunity to purchase the pictures.

SUMMARY OF THE INVENTION

Embodiments of the invention broadly contemplate systems and associated methods for generating custom media products along various story arcs. The story arcs correspond to sub-themes for organizing media content within a larger theme, or story, into a custom media product. The media content can include stock media content and custom media content, with the custom media content including captured media content corresponding to a guest or group of guests and/or rendered media content, such as computer generated graphics. Embodiments utilize authoring tools and automated workflow mechanisms to take various forms of raw media content (such as photos and videos of guests and/or stock photos, videos, music, animations and the like) and create customized media products for individual guests or groups of guests. Embodiments provide story templates, created during an authoring phase, which provide a plurality of story arcs for a given story. Embodiments utilize the story templates and associated rule set(s) in a generation phase to compile various media assets into a custom media product.

In summary, one aspect provides a method for generating a custom media product comprising: obtaining media content, the media content comprising custom media content and stock media content; associating the media content with a story template having a plurality of story arcs for a story; executing a rule set of the story template, said executing a rule set of the story template comprising combining the media content according to the rule set along one of the plurality of story arcs; and generating the custom media product.

Another aspect provides a computer program product comprising: a computer readable storage medium having computer readable program code embodied therewith for generating a custom media product, the computer readable program code comprising: computer readable program code configured to obtain media content, the media content comprising custom media content and stock media content; computer readable program code configured to associate the media content with a story template having a plurality of story arcs for a story; computer readable program code configured to execute a rule set of the story template, wherein to execute a rule set of the story template further comprises combining the media content according to the rule set along one of the plurality of story arcs; and computer readable program code configured to generate the custom media product.

A further aspect provides a system for generating a custom media product comprising: one or more processors; and a memory operatively connected to the one or more processors; wherein, responsive to execution of computer readable program code accessible to the one or more processors, the one or more processors are configured to: obtain media content, the media content comprising custom media content and stock media content; associate the media content with a story template having a plurality of story arcs for a story; execute a rule set of the story template, said executing a rule set of the story template comprising combining the media content according to the rule set along one of the plurality of story arcs; and generate the custom media product.

The foregoing is a summary. For a better understanding of example embodiments, together with other and further features and advantages thereof, reference is made to the following description, taken in conjunction with the accompanying drawings, and the scope of the invention will be pointed out in the appended claims.

BRIEF DESCRIPTION OF THE SEVERAL VIEWS OF THE DRAWINGS

FIG. 2A illustrates an example scene having both custom media content and stock media content.

DETAILED DESCRIPTION

Figure 1:
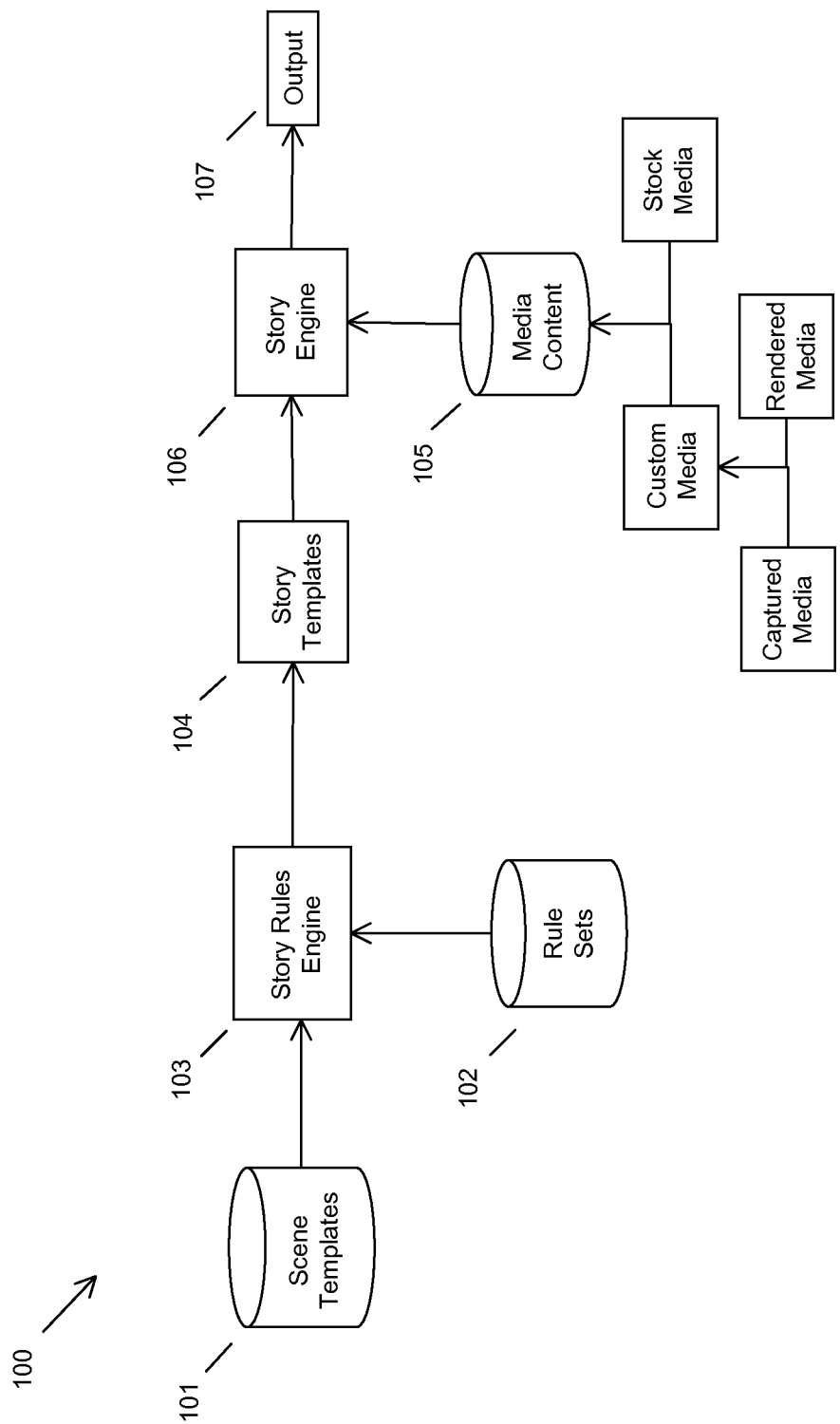
FIG. 1 illustrates an example system for generating custom media content output.

Components of the embodiments, as generally described and illustrated in the figures herein, may be arranged and designed in a wide variety of different configurations in addition to the described example embodiments. Thus, the following more detailed description of example embodiments, as represented in the figures, is not intended to limit the scope of the invention, as claimed, but is merely representative of example embodiments. Furthermore, the described features, structures, or characteristics may be combined in any suitable manner in one or more embodiments. In the following description, numerous specific details are provided to give a thorough understanding of embodiments.

Reference throughout this specification to embodiment(s) means that a particular feature, structure, or characteristic described in connection with the embodiment is included in at least one embodiment. Thus, appearances of the phrases "certain embodiments" or "example embodiment" or the like in various places throughout this specification are not necessarily all referring to the same embodiment.

At the outset, it should be noted that the term "story" takes the meaning of a general theme for organizing media content. The term "story arc" takes the meaning of a particular story line or sub-theme for organizing media content, where the particular organization can include more, less and/or the same media content (in a different arrangement/organization) when compared to another story arc of a story. That is, a story may be organized along different story arcs. The term "story instance" takes the meaning of a particular story produced using a particular story arc. The term "scene" takes the meaning of a particular media content or arrangement of media contents. The term "scene template" takes the meaning of an organization of one or more scenes, where a scene template can contain more than one version of a scene. The term "story template" takes the meaning of one or more scene templates and one or more rules for combining one or more scenes together, the rules including instructions such that one or more story arcs, or portions thereof, can be utilized to produce a particular story instance. The term "custom media content" takes the meaning of captured media content and/or rendered media content. The term "stock media content" takes the meaning of predefined media content.

The inventors have realized that, while providing a photographer or having a system at a venue to capture media (for example, take pictures) of guests at various points throughout the visit, and providing the guests with an opportunity to purchase the captured media (either at the venue or online) has become popular, this results in creation of disorganized media content. Moreover, venues such as theme and amusement parks are capable of producing many such photos and videos, for example hundreds or thousands of pictures for each of a large number of guests, derived from a variety of locations and systems throughout the venue. With the amount of media content generation increasing, organizing the raw/disorganized media content into a custom media product can be challenging. While various media content editing tools exist that automatically combine media content in a variety of ways, none use knowledge about the media content or the subjects in the media content to vary story arc(s) of an output custom media product.

For example, consider a given attraction at a theme park as a non-limiting example. A story author may contemplate the attraction, envision multiple story arcs regarding the attraction, and select multiple places in which to capture media content regarding the attraction for each of the story arcs. The inventors have recognized that what is needed are systems and associated methods that enable flexible creation of multiple story arcs, with a particular story arc (and associated media content) being selected based at least in part on what experience a particular guest or group of guests has while visiting the attraction. Such flexible creation should include the ability to create different story instances, along different story arcs, for each of a plurality of guests at the same attraction.

The inventors have recognized that a system is needed that can utilize different variations of a particular story depending on which story instance is most desirable, for example considering information about the guest(s) for which the custom media product is being created. Embodiments thus contemplate an "authoring phase" in which story templates, having a plurality of story arcs, and associated rules are created. Embodiments can use the story templates in a "generation phase", where a particular story instance is used to create custom media product(s) for each guest.

Accordingly, embodiments provide systems and methods for taking various forms of media content, such as photos and videos of guests, stock photos and videos, music selections, animations, special effects, digital or multimedia artifacts, et cetera, and using them to create customized media products along one or more story arcs for individual guests or groups of guests. Once a story author has created multiple story arcs for a given attraction or set of attractions, and selected places for media content capture, embodiments utilize templates to facilitate flexible story creation based on the media content captured, the information available about guest(s), and other relevant factors, as discussed further herein. A story author can thus break a story down into scenes, and for each scene, indicate which one of one or more alternate versions of each scene should be utilized in a given context. Within each scene, multiple content types (selected from various media types, including but not limited to custom and stock media content) can be selected for inclusion in a given story arc. Thus, depending on the nature of the guest(s), the nature of the visit, the type of the attraction, and the like, a customized media product can be produced using template(s) and rule set(s) created long before the actual custom media content is obtained.

Embodiments accomplish this for example by combining the output from media content authoring tools (such as Adobe Premiere®, or Adobe After Effects® authoring tools) with a rules engine (such as based on a Drools® rules management development tool, for example a JBoss® Rules tool) to allow story authors to design rich and flexible story templates. The presence of placeholder media in the created content is what makes this asset a template. The story templates in turn allow flexible creation of a story from a plurality of possible story arcs. The story templates can be thought of as describing a timeline or story arc, or component of a story arc. Embodiments establish an automated workflow mechanism to automate and direct how to combine media content assets, within the constraints of a story, to produce an output custom media product. The automated workflow mechanism uses rule set(s), which can be expressed in a programming language, to direct organization of media content assets along a given story arc. Drools® and JBoss® are registered trademarks of Red Hat, Inc. in the United States and/or other countries. Adobe Premiere® and After Effects® are registered trademarks of Adobe Systems Incorporated in the United States and/or other countries.

As a non-limiting example, Disney's Magic Kingdom® Park includes a Space Mountain® attraction. A story author contemplates a story for this attraction for a first time guest and a story for this attraction for a guest celebrating a birthday. Thus, the story author envisions two story arcs, one for the first time guest, and one for the guest celebrating a birthday. The story author then selects scenes for capturing media content for each story arc, inclusion of stock media content for each story arc, and/or inclusion of rendered media for each story arc. The locations for capturing custom media content can be the same. For example, the same camera positions are selected about the attraction for capturing media content for both stories. Space Mountain® is a trademark of Disney Enterprises, Inc. in the United States and/or other countries.

The story author may for example select scenes for capturing media content, for example scenes of a guest at various positions about the attraction, as well as scenes for inclusion of other media content (either custom media content such as rendered graphics and/or stock media content). The story author may select two versions of each of the scenes, one for each guest type. That is, a first version of media content for the first time guest, and another version of media content for the guest celebrating a birthday. The story author then creates scene templates containing the versions of the scenes, as well as instructions that indicate, based on the guest type, which of the scenes should be included in the story arc. Note that non-media capture content, such as rendered media or stock media, can be included in a completed story template. The scene templates and the rule sets are packaged together to create a story template configured to produce a custom story for each guest type.

Thus, for the guest visiting the attraction for the first time, a custom media product for such a guest may comprise a multimedia file including still photographs and/or video of the guest at particular points on the ride, captured per the story author's story template and organized into a story along with stock images, videos, rendered graphics, music and the like. For the guest who is celebrating a birthday, a different story arc with different versions of scene(s) is utilized to compose the story. For example, for the guest who is celebrating a birthday, the same media captures may be utilized, but different stock media, different rendered media, different music and the like may be selected as media content for the story.

As can be appreciated, using the story templates having a plurality of story arcs, a story author is free to create many different stories for many different attractions, types of guests, and the like. This can all be accomplished during the authoring phase, prior to generation of any custom media product.

As another non-limiting example, Disney's Magic Kingdom® Park includes a Space Mountain® attraction, a Splash Mountain® attraction, and a Big Thunder Mountain Railroad® attraction. A story author contemplates a story for this collection of attractions, such as "I conquered the mountains". The story author envisions two story arcs, one for a guest conquering the mountain rides for the first time and another for a guest conquering the mountain rides repeatedly. The story author then selects scenes, such as scenes including captured custom media content for each story arc. Splash Mountain® and Big Thunder Mountain Railroad® are trademarks of Disney Enterprises, Inc. in the United States and/or other countries.

The story author may for example select three scenes for capturing custom media content, for example a scene of a guest on each of the three rides. The story author may select two versions of each of the three scenes, one for each guest type. That is, a first location for custom media content capture for the first time rider, and another location for custom media content capture for the repeat rider. The story author then creates scene templates containing the versions of the scenes, as well as instructions that indicate, based on the guest type, which of the scenes should be included in the story arc. Note that non-media capture content can be included in a completed story template, as for example rendered media content and/or stock media content. The scene templates and the rule sets are packaged together to create a story template configured to produce a custom story for each guest type.

Thus, for the guest completing rides for all of the attractions for the first time, with a story instance of "I conquered the mountains", a custom media product for such a guest may comprise a multimedia file including still photographs and/or video of the guest at particular points on these rides organized into a story along with stock images, videos, rendered graphics and music. For the guest who is a repeat visitor of these attractions, a different story arc along the same story line may be more appropriate, so that the general story line is repeated, that is, "I conquered the mountains", but different scenes are utilized to compose the story. For example, for the repeat visitor, different media captures, such as from different portions of the attraction, may be selected as custom media content for combination with stock media content and the like for the story.

During the authoring phase, a story author creates one or more rule sets to determine which media content will ultimately be used for a particular story, that is, which story arc will be generated and what media content will comprise the particular story instance for the guest. While any of a variety of rules can be included in a rule set, three general rule types are described herein as non-limiting examples.

A first rule type includes rules directing which media content to include in a story based on the media content itself. For example, a particular media content file such as a photo will have metadata associated with it, as for example the time, the date, the location, et cetera regarding the photo creation. A second type of rule includes rules directing which media content to include in a story based on the information a guest provides. For example, a particular guest may indicate that the visit coincides with his or her birthday, anniversary, other special occasion, a group visit, or the like. A third rule type includes rules directing which media content to include based on information derived from the media content available at story initiation. For example, a rule may indicate that for a guest that has completed all mountain rides at the Magic Kingdom®, a particular set of media content should be included.

As will be appreciated by those having ordinary skill in the art, there are many ways to categorize or type the rules. For example, the rules described herein can be categorized as business rules, such as for example a rule of the second type (based on information provided by the guest) can include a business rule: if guest has opted into program A: then, include media content from scene B. A story author can include such a rule as part of a template at story creation/authoring time. Non-limiting examples of such rules will be further described herein to facilitate understanding of the flexibility permitted by embodiments, which fosters the creative process and allows for generation of highly customized media products.

The description now turns to the figures. The illustrated example embodiments will be best understood by reference to the figures. The following description is intended only by way of example and simply illustrates certain embodiments representative of the invention, as claimed.

FIG. 1 illustrates a system for custom media product generation along various story arcs. An example system 100 includes one or more storage devices containing custom scene templates 101 and rule set(s) 102, where the scene templates 101 and rule set(s) 102 are combined to form story templates 104. The scene templates 101 act as input for a custom story rules engine 103, which arranges scenes of the custom scene templates 101 according a rule set 102 to produce story templates 104.

Scene templates 101 can be created using industry standard tools, for example Adobe Premiere® authoring tool, and contain project files that can be processed and serve as input to the custom story rules engine 103 to create a story template 104. The story template 104 can describe multiple possible story arcs, depending on the rule set invoked. It is thus possible to automatically create custom media product output 107 from the story template 104 along multiple story arcs. The story engine 106 allows a story arc, defined by a rule set 102, to be customized by the media content 105, as further described herein.

The media content 105 can include custom media content and stock media content. The custom media content, which can include captured media content and/or rendered media content, is associated with the guest(s) or groups of guests through any of a variety of mechanisms. For example, the photographer or automated system capturing photos of guests can include metadata along with the photo, such as the date, the time, the location, the guest identification, and the like. The stock media content is predefined, such as pictures, videos and like of the venue, theme characters, et cetera, and can likewise indicate as much via associated metadata.

The media content 105 is presented to the story engine 106 along with metadata known about the media content 105 and/or the subject matter of the media content 105 (for example, the guests, the attractions, the theme characters, or combinations thereof represented by the media content 105). The story engine 106 arranges scenes according to the operative rule set 102 and the available media content 105 to produce an output media file 107. Multiple story output 107 formats can be created, such as video, scrapbooks, flip books, photos, et cetera.

FIG. 2A illustrates an example scene. The example scene (Scene 1a) includes both custom media and stock media. The custom media content can include captured media content, such as a picture or video of a guest, and/or rendered media content, such as a computer generated animation. As arranged, the scene has a background of stock media, such as a picture of a particular attraction, a particular venue or the like. The stock media can further include various other media types, such as video, audio, text or the like. The custom media overlays the stock media in the illustrated scene. Different versions of the example scene are possible, for example by modulating the custom media or the stock media incorporated. A story author can thus create a variety of different versions of scenes for a scene template, which is included in a story template.

Figure 2B:
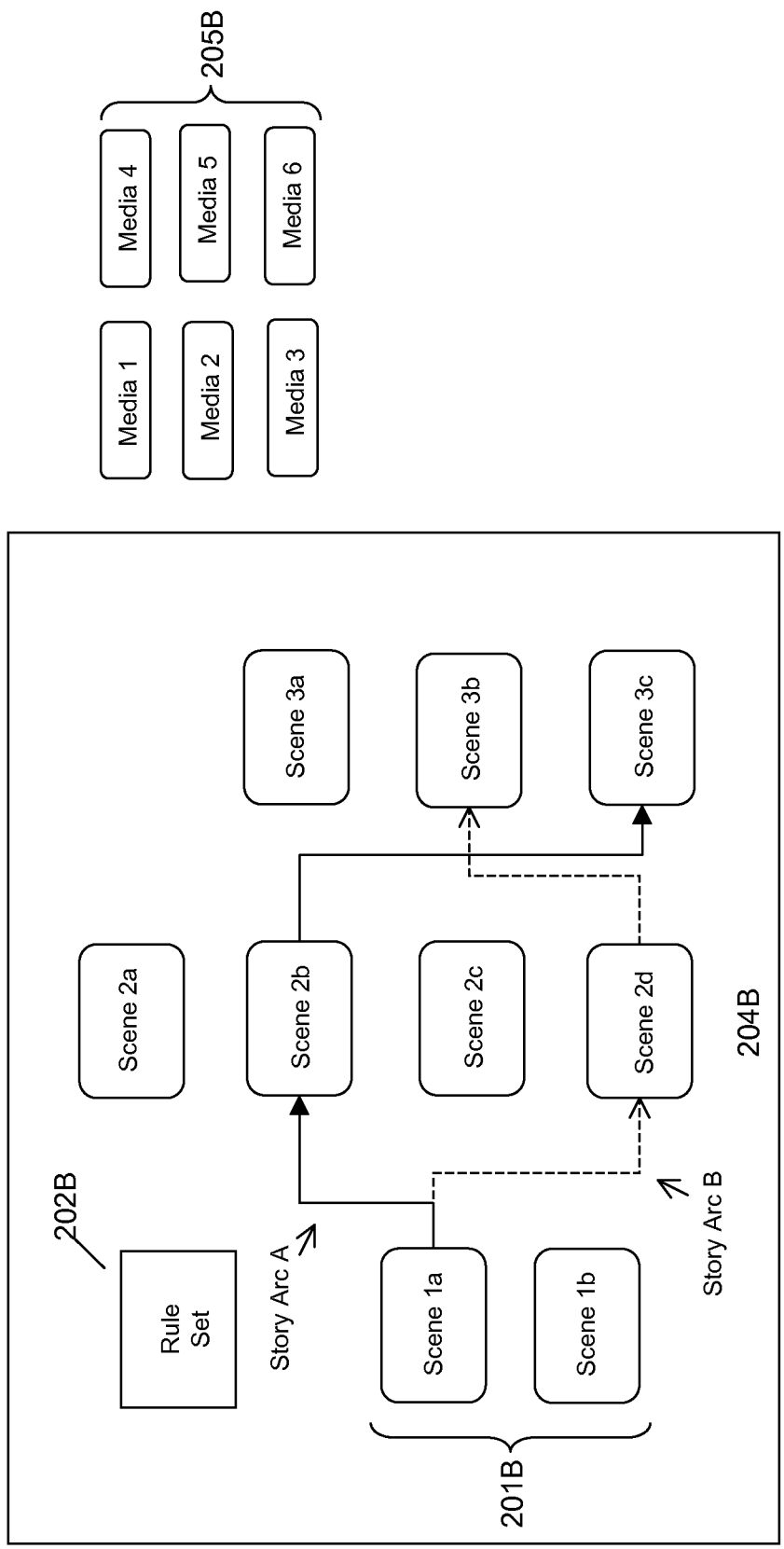
FIG. 2B illustrates an example story template and associated media content.

FIG. 2B illustrates an example story template. A particular story instance, such as defined by Story Arc A, is composed of one or more scenes organized in a particular way, for example as envisioned by a story author. A scene template 201B for each scene can be created using an industry standard tool (for example, Adobe Premiere® media content editing software or the like). Placeholder media is used for media content 205B in the scene templates 201B. The media content 205B of the actual story will be substituted for the placeholder media later. For example, for custom media content, such as a photo, video, et cetera of guest(s) in a theme park, a placeholder in the scene template 201B holds the place of a particular custom media content file, such as a photograph captured for that particular guest, until such custom media content file is inserted by the story engine. For stock media content, such as video, photos, music, et cetera, which is predefined as part of a particular story instance and can be created before the guest even arrives, either placeholder media or actual stock media content can be used. Multiple, alternate versions of a scene can be created in the scene template 201B to support variability in the final output. For example, for two versions of Scene 1, Scene 1a and Scene 1b, are illustrated. This may correspond to the scenario where a scene template 201B includes placeholders for inclusion of a first Scene 1 file for a first guest, but another Scene 1 file for a second guest, as per the rule set.

These scene templates 201B are processed to serve as input to the custom story rules engine 103 to create a story template 204B that can describe multiple possible story arcs (Story Arc A, Story Arc B), as per the rule set 202B. Then, the story engine 106 creates output using the story template 204B for the given story arc, for example Story Arc A, when a story instance is initiated. The story arc can be customized based on the media content 205B presented to the system and/or the metadata known about the media content 205B (and/or the subject matter represented by the media content 205B). For example, Story Arc A may be invoked for the first guest, whereas Story Arc B may be invoked for the second guest.

Such an approach allows story authors great freedom in creating story templates 204B, and provides a simplified way to manipulate the story arc based on rule sets for inclusion of differing scenes and versions of scenes. Embodiments thus allow for the creation of custom stories for individuals or small groups when the exact set of media content assets 205B and other select information available (such as information about guests) is unknown to the story author at story authoring time.

Embodiments can produce as output both linear stories, expressed as a sequence, or non-linear stories which can be viewed as a whole, or in any order (for example, a map or collage). Embodiments also allow for variability and repeatability of experiences. For example, for a repeat guest or for each guest in a group, instead of the repeat guest or each guest in the group getting the same photo taken on a ride included in the story, the system can recognize a guest has been on the attraction before or is a member of a particular group, and create an alternate story arc/output for that repeat guest or each guest of the group. Other possibilities include varying output based on time of day (for example, varying a story arc based on the time of day when the media content is captured (day versus night), based on the time of year the media content is captured (to support seasonal overlays), and guest-specific events (such as personalizing a story for birthdays, anniversaries, first visit, et cetera)).

Figure 3:
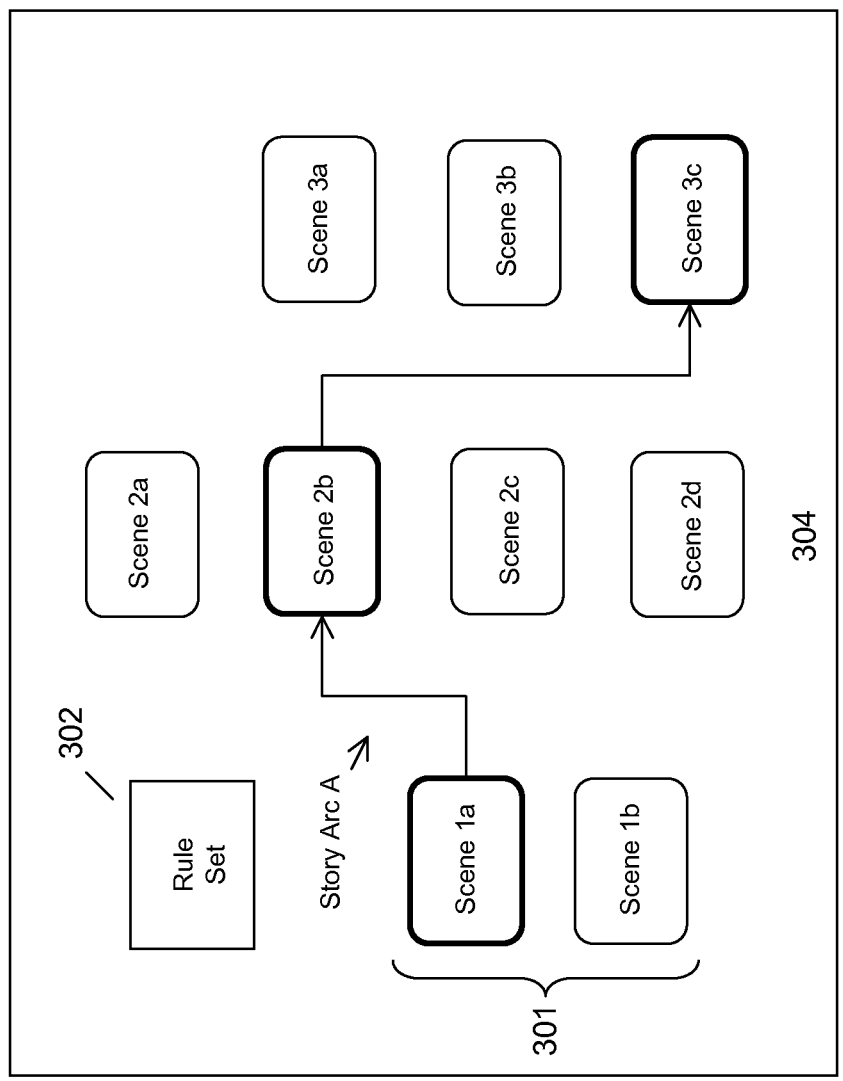
FIG. 3 illustrates an example of scene selection according to a rule set.

Referring to FIG. 3, illustrated is an example of scene selection according to a rule set. Rules sets, such as rule set 302, are created to govern how the final output is generated. During the generation phase, the rule set 302 drives the story engine 106 component, directing the story engine 106 to combine media content once a story has been initiated. Thus, the rule set 302 defines the story arc (Story Arc A) to produce an output.

A story author encodes the rule set 302. The rules set can include rules for combining scenes and/or for initiating a story output generation. Story output generation can be initiated for a story template 304 either manually or automatically. For example, manual initiation corresponds to a scenario where media content 205 is identified and supplied to the story engine 106. For automatic initiation, this can correspond for example to a scenario where the story engine 106 initiates the generation of a story instance when rule(s) encoded in the rule set 302 are satisfied. For example, a rule set may include instructions such that for a particular guest, once all three mountain rides at the Magic Kingdom® have been completed, a story template for "I conquered the mountains" is initiated. The relevant media content (for example, pictures taken from the three rides of the particular guest) is then obtained by the story engine and compiled along a particular story arc according to the story template and the rule set.

For combining scenes, the rule set 302 can be a compilation of one or more business rules, creative directions, and/or be derived automatically from a story representation or satisfaction of particular conditions. For example, scene templates 301 and rule set 302 are packaged together to create the story template 304, but all scenes do not need to be present in a particular story instance. Thus, the system can automatically omit a scene corresponding to a daytime picture if metadata is available regarding the guest being at an attraction at night. Thus, the rule set 302 can include instruction for such an omission based on satisfaction of this condition. The rule set could be encoded to instruct the story engine to include another media content file in the story in the event that the daytime condition is not satisfied. Stories may therefore be defined by the rule set 302 hierarchically; allowing the story to grow/develop based on certain conditions (such as availability of certain media, satisfaction of a particular business rule, et cetera).

Figure 4:
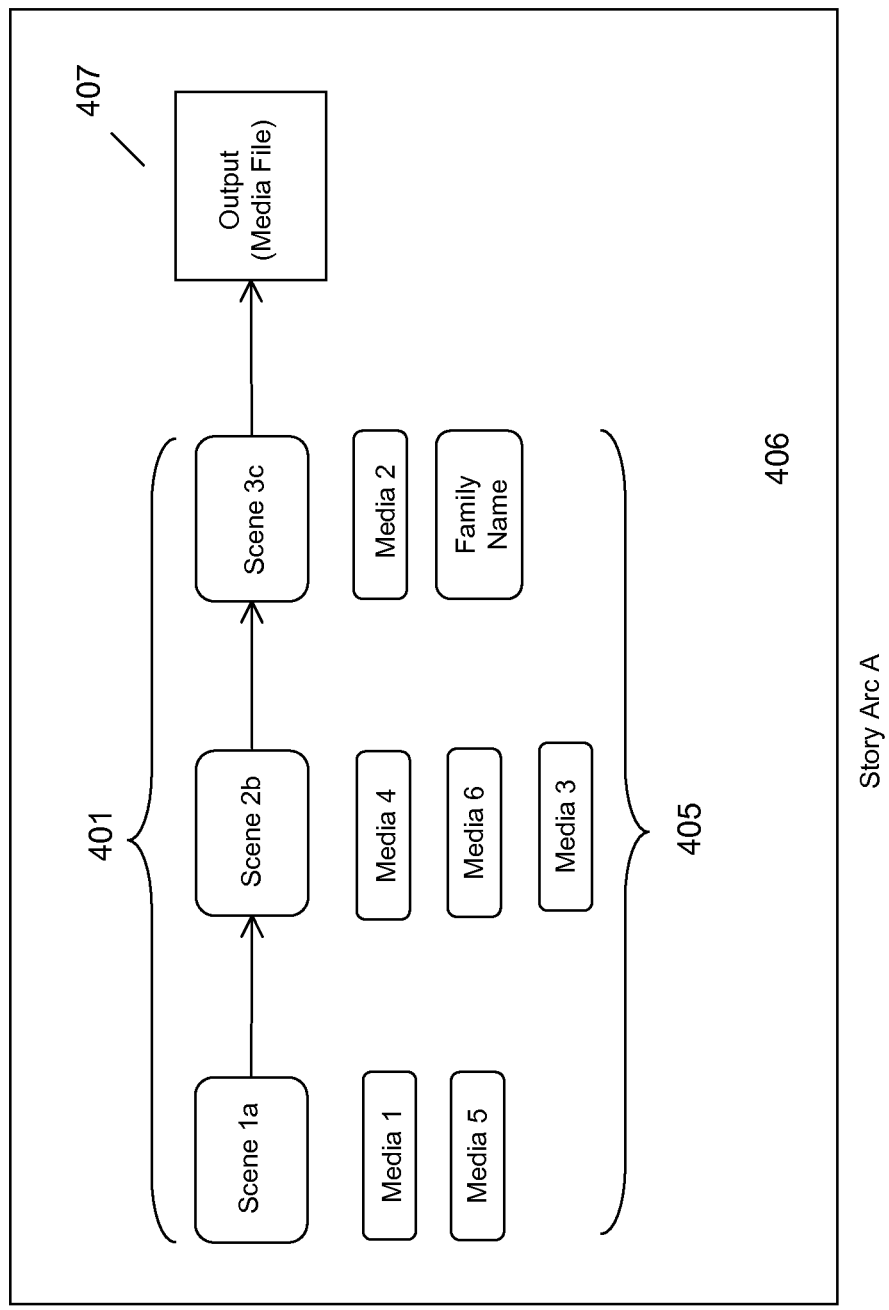
FIG. 4 illustrates an example scene and media content combination.

Referring to FIG. 4, an example scene and media content compilation by the story engine is illustrated. The story engine 406 executes instructions in the rule set to produce a story instance 407. Based for example on the media content present and the metadata available, a story arc (Story Arc A) is chosen by selecting specific variations (Scene 1a, Scene 2b, and Scene 3c) of each scene to be included in the story. The story engine 406 replaces the placeholders in each scene template (Scene 1a, Scene 2b, and Scene 3c) with custom media content 405 (Media 1-6). In addition, customizations and personalization can be added, such as adding a name (Family Name) to provide a title or caption, or by selecting specific background, et cetera. This customization/personalization can be driven by metadata known about the media content 405 or the subject(s) which the media content 405 represents. Thus, the story engine 406 executes rule sets and produces a story instance along a particular story arc. Story output 407 can be traditional arc-based stories, as well as stories represented as a map, a collage, a collection of images or even a single image. Multiple story outputs can be defined in a single story template, for example, story template 304 can be utilized for Story Arc A and Story Arc B.

Story output 407 may be rendered in a variety of formats. For example, a story output 407 may be rendered as video, images, page layouts, et cetera, and may be delivered as a file turned into a product (such as a compact disc, DVD, photo, photo book, et cetera), stored in storage device, or even streamed to a device (such as a phone, a computer, a television, et cetera).

Figure 5:
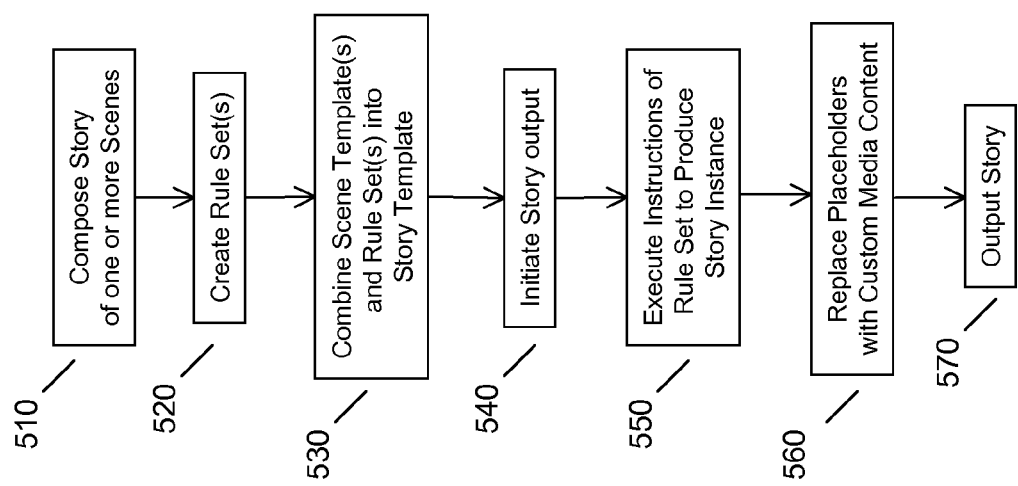
FIG. 5 illustrates an example of media content organization to generate a story output.

FIG. 5 illustrates an example of media content organization to generate a story output. A story author composes a story of one or more scenes 510. Story composition can include for example, including choices among multiple versions of scenes for inclusion in a story. As a non-limiting example, a story author composes an "I conquered the mountains" story that is composed of three scenes, one scene for each of three mountain rides at an attraction. Again, each scene may have multiple versions, such as different locations for media content capture, to provide for multiple story arcs.

The story author creates a rule set 520 to instruct how the scenes should be compiled in the final output. Again, the rule set can include instructions for inclusion of one or more scene versions available in a scene template based on the particular media content available, based on the satisfaction of particular rules, or the like. A story rules engine then combines 530 the scene templates containing the scene versions and the rule set(s) to generate a story template for use by the story engine. Alternatively, a story template can be compiled by accessing scene templates and rule set(s) stored separately, or any other of a variety of ways known to those having ordinary skill in the art.

When making of a custom media product is initiated 540, either manually or automatically, as described herein, the story engine executes the rule set to produce a story instance along the story arc of choice, where the choice of story arc may be influenced by the media content itself, as well as satisfaction of particular rules within the rule set and the like. In producing the story instance, the story engine obtains the relevant media, such as the photos of a particular guest riding each of the three mountain rides. The story engine associates the obtained media with the particular story template, for example based on the determination of a rules engine. In this example, "I conquered the mountains" story template is chose, and the story engine executes the rule set for the "I conquered the mountains" story template. The story engine replaces 560 the placeholders previously inserted by the story author with this custom media content. The rules set instructs the story engine as to which story arc to follow based on the media content available (pictures of a particular guest, for example a first time guest, instructs use of a particular story arc within the story template), allowing a final output story to be produced 570.

Figure 6:
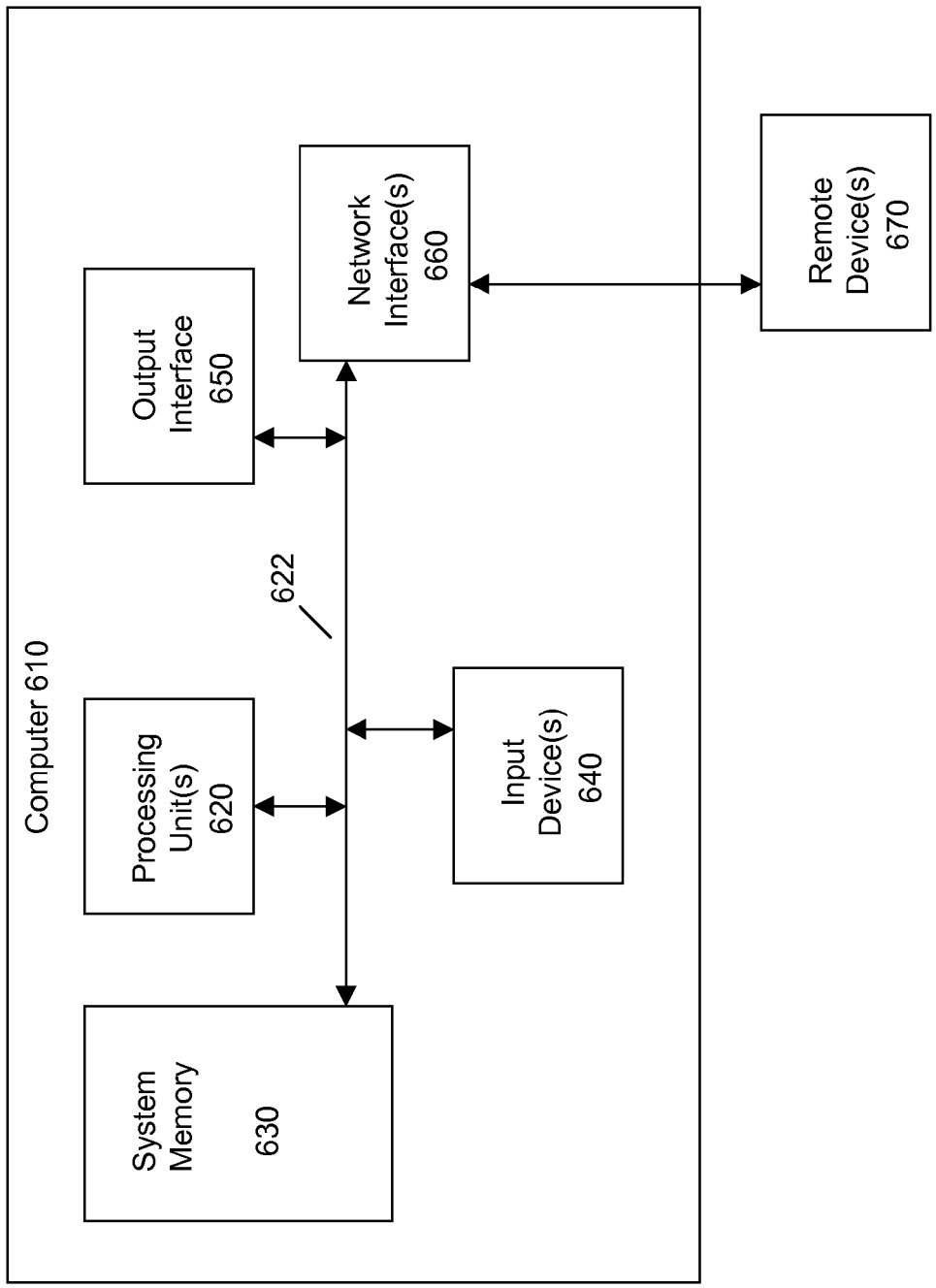
FIG. 6 illustrates an example computer.

Referring to FIG. 6, it will be readily understood that embodiments can be implemented using any of a wide variety of devices or combinations of devices. An example device that may be used in implementing one or more embodiments includes a computing device in the form of a computer 610. In this regard, the computer 610 may execute program instructions configured to perform steps involved in scene template creation, rule set creation, story template creation, initiation of story output production, executing instructions in a rule set for producing a story instance by including custom media content and stock media content in a final product, and perform other functionality of the embodiments, as described herein.

Components of computer 610 may include, but are not limited to, processing units 620, a system memory 630, and a system bus 622 that couples various system components including the system memory 630 to the processing unit 620. Computer 610 may include or have access to a variety of computer readable media. The system memory 530 may include computer readable storage media in the form of volatile and/or nonvolatile memory such as read only memory (ROM) and/or random access memory (RAM). By way of example, and not limitation, system memory 630 may also include an operating system, application programs, other program modules, and program data.

A user can interface with (for example, enter commands and information) the computer 610 through input devices 640, which can include remote input devices. Alternatively, a computer may run in a fully or semi-automated or unattended mode. A monitor or other type of device can also be connected to the system bus 622 via an interface, such as an output interface 650. In addition to a monitor, computers may also include other peripheral output devices. The computer 610 may operate in a networked or distributed environment using logical connections to one or more other remote computers or databases, such as a remotely located digital camera system configured to automatically capture custom media content. The logical connections may include a network, such local area network (LAN) or a wide area network (WAN), but may also include other networks/buses.

It should be noted as well that certain embodiments may be implemented as a system, method or computer program product. Accordingly, aspects of the invention may take the form of an entirely hardware embodiment, an entirely software embodiment (including firmware, resident software, micro-code, et cetera) or an embodiment combining software and hardware aspects. Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative embodiments have been described herein with reference to the accompanying drawings, it is to be understood that the embodiments are not limited to those precise embodiments, and that various other changes and modifications may be affected therein by one skilled in the art without departing from the scope or spirit of the disclosure.

What is claimed is:

1. A method for generating a custom media product comprising:
   obtaining media content, the media content comprising custom media content and stock media content;
   associating the media content with a story template having a plurality of story arcs for a story;
   executing a rule set of the story template, said executing a rule set of the story template comprising combining the media content according to the rule set along one of the plurality of story arcs; and
   generating the custom media product.

2. The method according to claim 1, further comprising choosing a story arc from the plurality of story arcs based on available media content.

3. The method according to claim 1, wherein the custom media content comprises one or more of captured media content and rendered media content.

4. The method according to claim 1, wherein executing a rule set of the story template comprises replacing one or more placeholders of the story template with one or more custom media contents.

5. The method according to claim 1, wherein the story template comprises one or more scene templates and one or more rule sets.

6. The method according to claim 5, wherein the one or more scene templates comprise one or more scene versions.

7. The method according to claim 6, wherein the one or more scene versions correspond to one or more custom media contents corresponding to different views of an attraction.

8. The method according to claim 1, wherein the custom media content comprises media content associated with one or more guests.

9. The method according to claim 1, wherein:
   the plurality of story arcs correspond to a plurality of story instances for the story; and
   one of the plurality of story instances is initiated from the plurality of story arcs based upon one or more of: metadata regarding media content availability, metadata regarding media content subject matter, and metadata regarding satisfaction of one or more rules.

10. The method according to claim 1, wherein:
    obtaining media content comprises capturing media corresponding to one or more guests at various locations of an attraction; and
    generating the custom media product comprises one or more of writing a custom media file to a tangible storage device and streaming a custom media file over a network connection to a remote device.

11. A computer program product comprising:
    a non-transitory computer readable storage medium having computer readable program code embodied therewith for generating a custom media product, the computer readable program code comprising:
    computer readable program code configured to obtain media content, the media content comprising custom media content and stock media content;
    computer readable program code configured to associate the media content with a story template having a plurality of story arcs for a story;
    computer readable program code configured to execute a rule set of the story template, wherein to execute a rule set of the story template further comprises combining the media content according to the mle set along one of the plurality of story arcs; and
    computer readable program code configured to generate the custom media product.

12. The computer program product according to claim 11, further comprising computer readable program code configured to choose a story arc from the plurality of story arcs based on available media content.

13. The computer program product according to claim 11, wherein the custom media content comprises one or more of captured media content and rendered media content.

14. The computer program product according to claim 11, wherein to execute a rule set of the story template comprises replacing one or more placeholders of the story template with one or more custom media contents.

15. The computer program product according to claim 11, wherein the story template comprises one or more scene templates and one or more rule sets.

16. The computer program product according to claim 15, wherein the one or more scene templates comprise one or more scene versions.

17. The computer program product according to claim 16, wherein the one or more scene versions correspond to one or more custom media contents corresponding to different views of an attraction.

18. The computer program product according to claim 11, wherein the custom media content comprises media content associated with one or more guests.

19. The computer program product according to claim 11, wherein:
    the plurality of story arcs correspond to a plurality of story instances for the story; and
    one of the plurality of story instances is initiated from the plurality of story arcs based upon one or more of: metadata regarding media content availability, metadata regarding media content subject matter, and metadata regarding satisfaction of one or more rules.

20. A system for generating a custom media product comprising:
- one or more processors; and
- a memory operatively connected to the one or more processors;
- wherein, responsive to execution of computer readable program code accessible to the one or more processors, the one or more processors are configured to:
- obtain media content, the media content comprising custom media content and stock media content;
- associate the media content with a story template having a plurality of story arcs for a story;
- execute a rule set of the story template, said executing a rule set of the story template comprising combining the media content according to the rule set along one of the plurality of story arcs; and
- generate the custom media product.

* * * * *